(12) United States Patent
Pesicek (10) Patent No.: US 8,352,332 B2
(45) Date of Patent: Jan. 8, 2013

(54) METHOD AND APPARATUS FOR ORDERING PAINT USING A PORTABLE SELF-CONTAINED TOOL

(76) Inventor: John Pesicek, Renton, WA (US)

( * ) Notice: Subject to any disclaimer, the term of this patent is extended or adjusted under 35 U.S.C. 154(b) by 34 days.

(21) Appl. No.: 12/777,533

(22) Filed: May 11, 2010

(65) Prior Publication Data

US 2011/0282763 A1 Nov. 17, 2011

(51) Int. Cl.
*G06Q 30/00* (2012.01)
(52) U.S. Cl. .......... 705/26.7; 356/319; 367/99; 702/155
(58) Field of Classification Search ................ 705/26.1, 705/26.7, 27.1; 356/4.01, 3, 73, 319, 445, 356/300; 367/99; 702/155, 156
See application file for complete search history.

(56) References Cited

U.S. PATENT DOCUMENTS

| | | | | |
|---|---|---|---|---|
| 4,887,217 A | * | 12/1989 | Sherman et al. | 700/117 |
| 6,040,902 A | * | 3/2000 | Jung et al. | 356/73 |
| 6,118,521 A | * | 9/2000 | Jung et al. | 356/73 |
| 6,446,030 B1 | * | 9/2002 | Hoffman et al. | 703/1 |
| 6,507,824 B1 | * | 1/2003 | Yon et al. | 705/26.5 |
| 6,959,284 B1 | * | 10/2005 | Howes | 705/26.5 |
| 7,571,122 B2 | * | 8/2009 | Howes | 705/26.1 |
| 7,605,824 B2 | * | 10/2009 | Reynolds et al. | 345/589 |
| 2003/0158788 A1 | * | 8/2003 | Turpin et al. | 705/26 |
| 2004/0078299 A1 | * | 4/2004 | Down-Logan et al. | 705/27 |
| 2005/0128484 A1 | * | 6/2005 | Rodrigues et al. | 356/402 |
| 2006/0195369 A1 | * | 8/2006 | Webb et al. | 705/27 |

OTHER PUBLICATIONS http://wayback.archive.org/web/*/http://www.the-wordsmiths.com/images/Product_MatchRite.pdf—Nov. 9, 2006.*

* cited by examiner

*Primary Examiner* — Matthew Zimmerman
(74) *Attorney, Agent, or Firm* — Lowe Graham Jones PLLC (57) ABSTRACT

A method and a system for ordering paint to cover a surface includes, retrieving a color value from a machine-readable memory to a processor. The processor retrieves a paint quantity from a machine-readable memory. The processor compiles an order for paint including the paint quantity and color value and then transmits the order from the processor to a vendor for formulating the paint quantity having the color value when painted upon the surface and allowed to dry.

14 Claims, 8 Drawing Sheets

METHOD AND APPARATUS FOR ORDERING PAINT USING A PORTABLE SELF-CONTAINED TOOL

FIELD OF THE INVENTION

This invention relates generally to spectrophotometry and, more specifically, to a method of and apparatus for spectrophotometry.

BACKGROUND OF THE INVENTION

Paint is a multibillion-dollar product in the United States, and it's one of the few products that is growing in sales despite the recession. Sales are expected to reach $12.5 billion in 2010, according to the Home Improvement Research Institute, and that huge market has manufacturers introducing multiple brands through a constantly shifting array of retailers.

A trend in the industry is the recent recognition of women as important decision makers in the do-it-yourself (DIY) market, altering the way the industry does business. Both Lowe's and Home Depot reported in 2001 that over 50 percent of their customer base was female. With an influx of women shoppers into the DIY market, home improvement and specialty stores alike are working hard to organize their stores to be bright, open, and attractive to women. New offerings include in-store design centers, more designer paint brands, and more extensive paint color samples. For example, Benjamin Moore & Co. offers approximately 3,200 colors of paint and can match almost any color using its Color Preview System. (The Color Preview Fan Deck is a compact, portable fan deck comprising a vast number of paint samples on individual cards. The Color Preview palette is divided into Organic and Inorganic colors to allow for easy reference of clean true colors versus complex, natural colors.)

Too often, however, the impetus among amateur remodelers of homes who paint or finish rooms or furniture within those homes are motivated by a desire to match a particular look or, importantly, a particular color or set of colors within a vision of a room. Fan decks are not as helpful in this regard and near matches generally characterize selections. For example, a collector of antiques and curios might own a treasured piece that is to be the centerpiece of the room as finished. For example, a Fuzhou Bodiless Lacquer Chest from the Qing Dynasty might well be selected as a dominate piece in a room. Fuzhou bodiless lacquer is firm and light, unique and elegant, with magnificent and bright color and luster. A fan deck might provide a red in the vicinity of the Fuzhou Lacquer but may include other tints that detract from the purity of Qing Dynasty Red.

Nonetheless, it is highly desirable to acquire a paint that will match this piece precisely. Spectrophotometry is fairly well-known art and is used at many endeavors that range from matching replacement enamel to existing teeth in a patient's mouth in dentistry to selecting cultured bacteria based upon color reflectance. In order to use spectrophotometery for tinting paints, the user must additionally exploit a computer. The light reflected from the object to be matched is compared to known responses of the sensor within the spectrophotometer to known colors. By means of nonlimiting examply, the TAOS/Parallax TCS230 color-matching program measures color by comparision to known colors. Color matching is done using a "minimax" approach in the RGB color space. In this method, the distance between two colors is the absolute value of the difference between the RGB component that differs most:

$$Di = \max\{|R-Ri|, |G-Gi|, |B-Bi|\}$$

where R, G, and B are the red, green, and blue coordinates of the color being scanned; and Ri, Gi, and Bi are the coordinates of stored color i. The color with the closest match is taken to be the one whose is the smallest, i.e. Di is the smallest, i.e. minimizing the maximum difference. Hence the term "minimax".

In such an instance, however, the stored colors are limited in number and generally are selected to represent a single company's offerings. For example, one such instrument is the Benjamin Moore™ Pocket Palette™ is a hand held electronic color palette search instrument. "With only one press of a button, Pocket Palette utilizes X-Rite's™ proprietary color measurement technology to accurately read and display the correct Benjamin Moore paint color name and number, taking the guess work out of matching colors." Nonetheless, the user still cannot use the device for much more than the narrowing of choices Even given the assistance the Benjamin Moore™ device might yield, that assistance does not help in the estimation of quantities of paint nor of selection of complementary colors. Nor does it assist the user in the actual purchase of paints necessary to meet their needs.

What is needed in the art is a device to assist a user in the selection and purchase of tints to prepare paints to match selected colors.

SUMMARY OF THE INVENTION

A method and a system for ordering paint to cover a surface includes, retrieving a color value from a machine-readable memory to a processor. The processor retrieves a paint quantity from a machine-readable memory. The processor compiles an order for paint including the paint quantity and color value and then transmits the order from the processor to a vendor for formulating the paint quantity having the color value when painted upon the surface and allowed to dry.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

A method and a system for ordering paint to cover a surface includes, retrieving a color value from a machine-readable memory to a processor. The processor retrieves a paint quantity from a machine-readable memory. The processor compiles an order for paint including the paint quantity and color value and then transmits the order from the processor to a vendor for formulating the paint quantity having the color value when painted upon the surface and allowed to dry.

Figure 1:
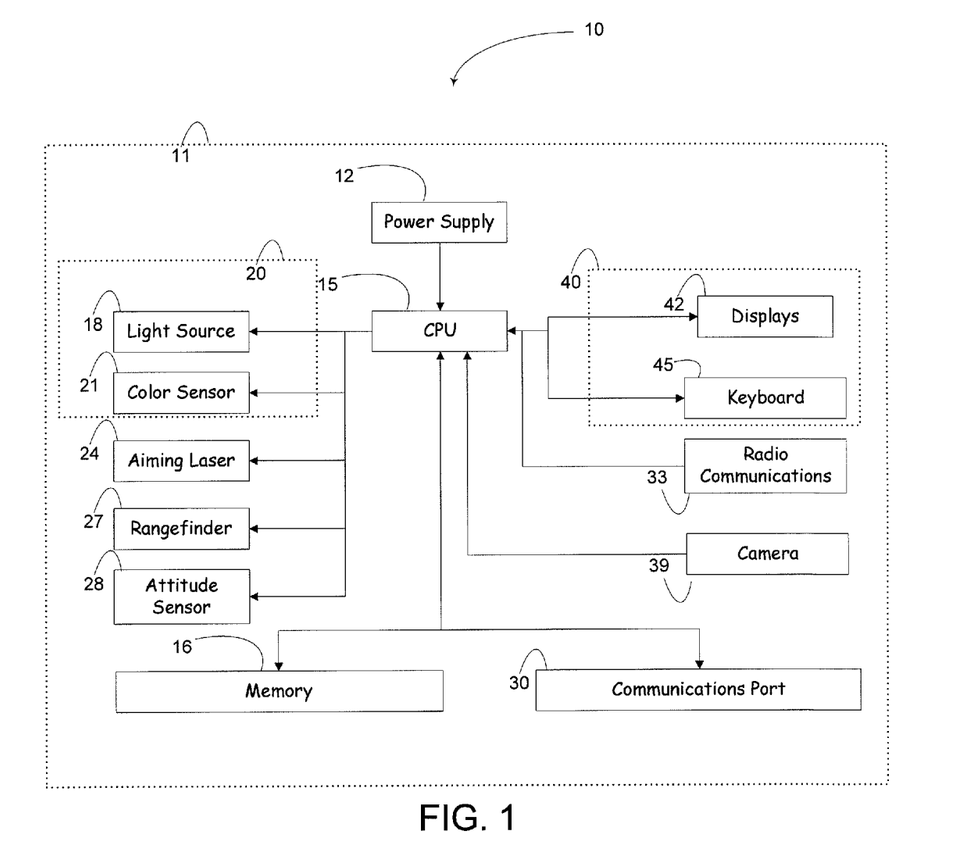
FIG. 1 is a block diagram of a system for ordering paint
Figure 2:
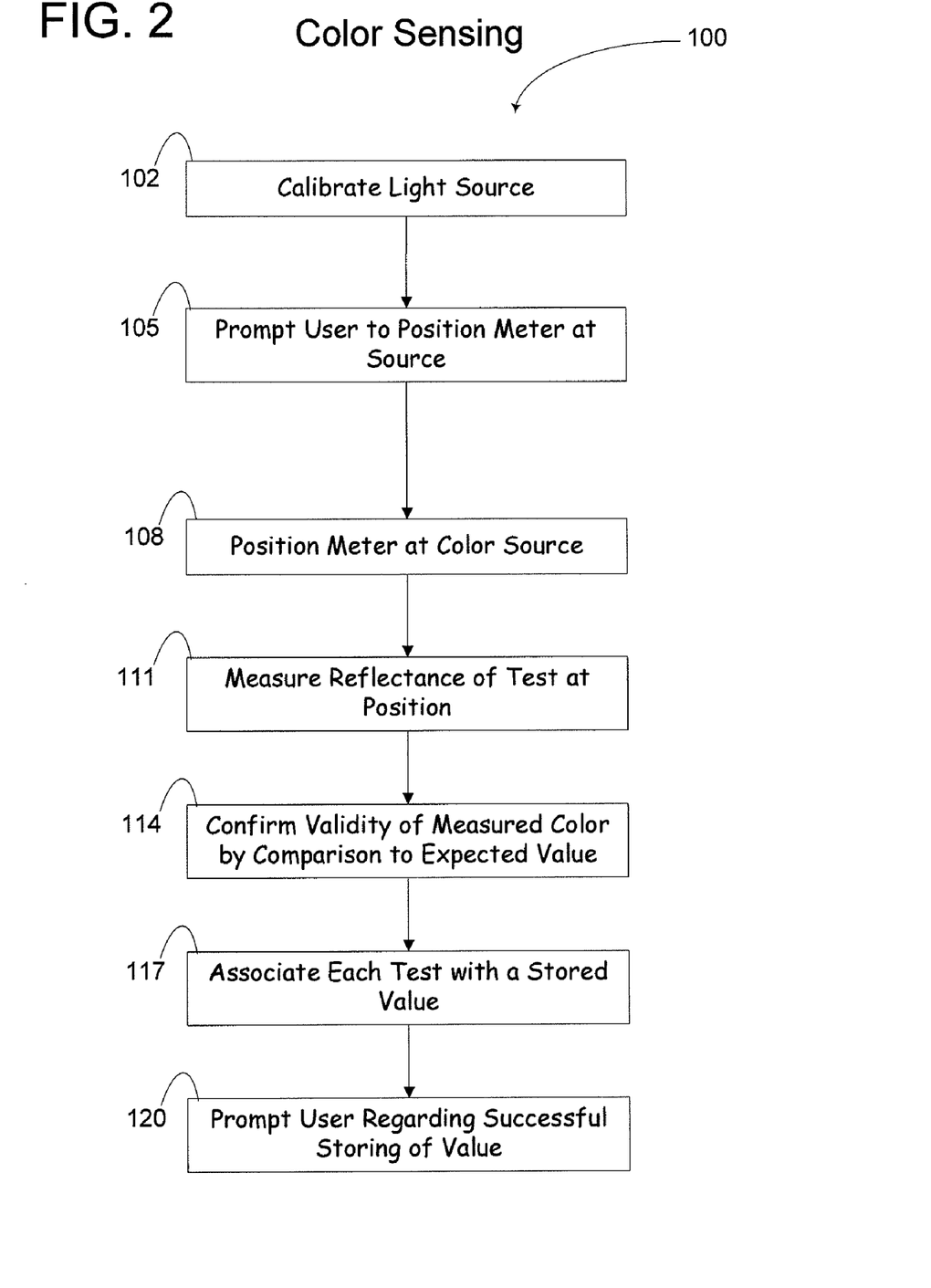
FIG. 2 is a flow chart for a method of sensing a color.
Figure 3:
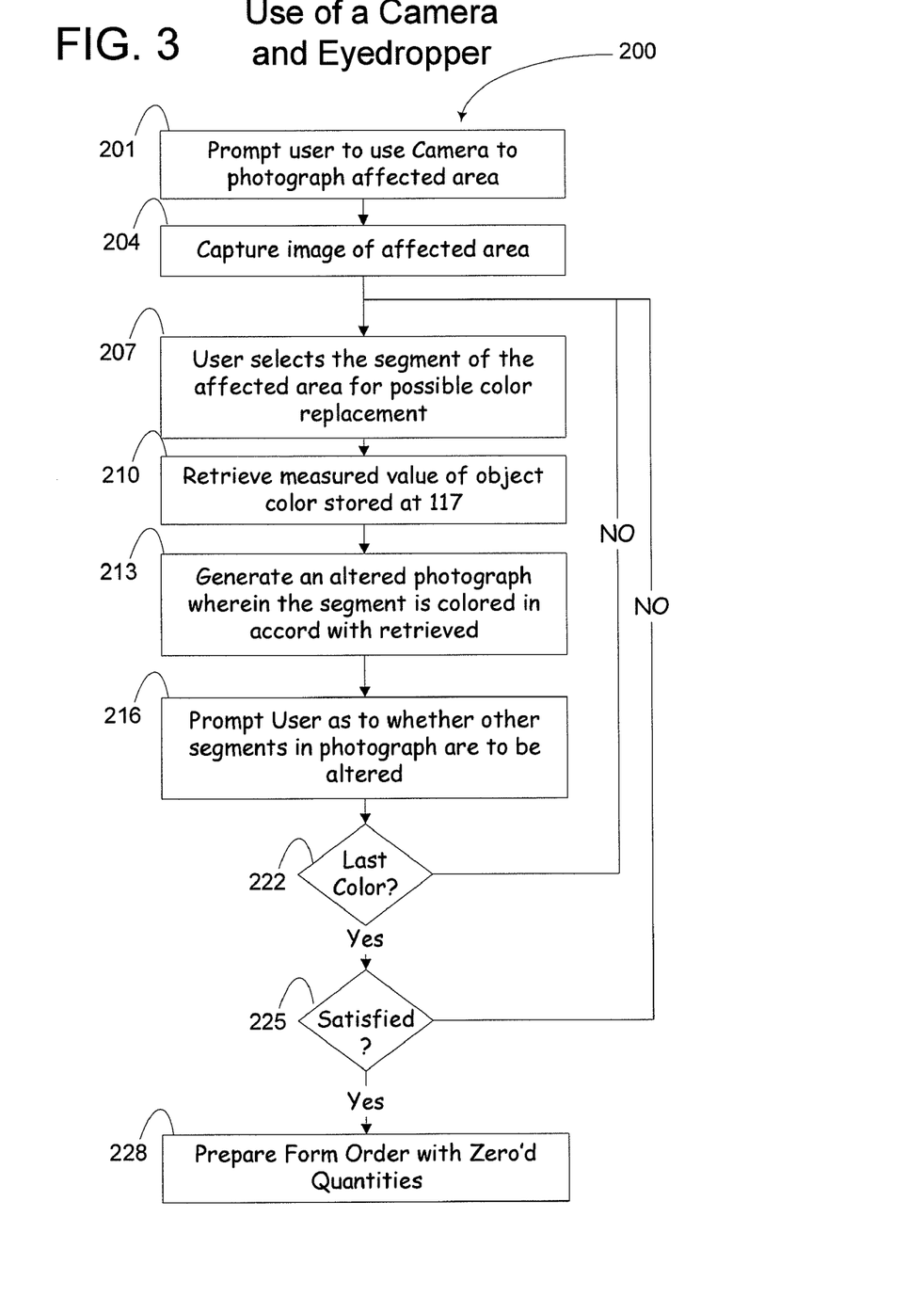
FIG. 3 is a flow chart for a method of obtaining an image and "color switching" that image to represent a surface painted with a sensed color.
Figure 4:
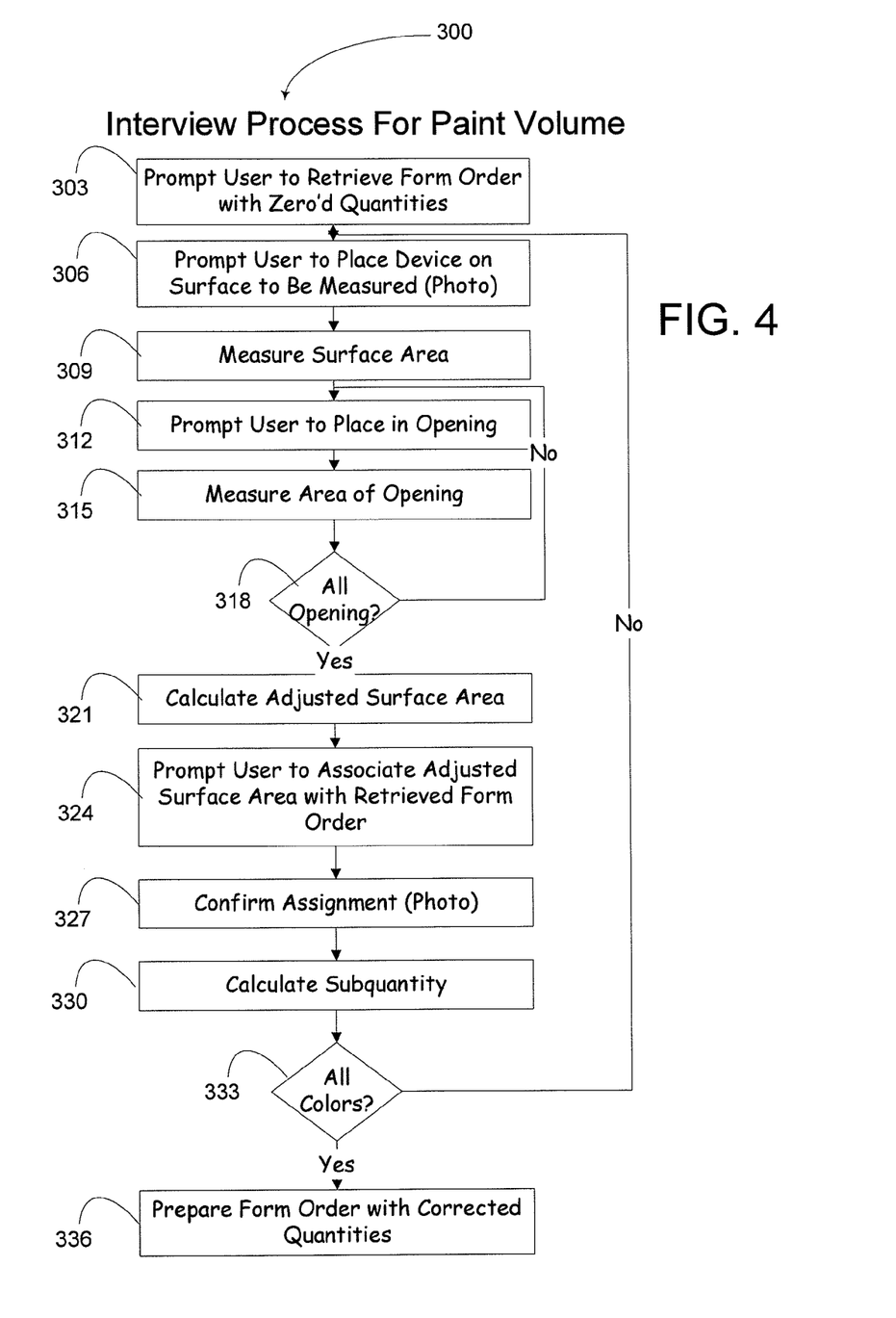
FIG. 4 is a flow chart for a method of estimating paint volume.

The FIG. 1 illustrates a block diagram, while FIGS. 2-4 depict schematic representation of various views of the proposed instrument for the invented concept of a paint purchasing tool operating on color matching logic. It depicts a conceptual representation and does not portray the actual instrument. Referring to FIGS. 1 and 2, it can be seen that the paint purchasing tool 10 comprises of a housing 11, a color sensing means 20 comprising of a light source 18 and a light sensing means 21. The color sensing means 20 is exhibited here in its most rudimentary form but is not presented to limit the invention. The color sensing means 20 may include, by way of nonlimiting example, the assembly taught in U.S. Pat. No. 7,557,925 granted to Nisper, et al. on Jul. 7, 2009, entitled, "Optical instrument and parts thereof for optimally defining light pathways" incorporated fully by this reference. In that nonliming example, an optical assembly or color sensor 20 is disclosed that includes a light source 18, a light sensing means 21, a monitor sensor, and an optical piece having a first side adapted to face a sample. The optical piece defines an illumination channel extending from the illumination source toward the first side, a detection channel extending from the first side toward the detection sensor, and a monitor channel extending from the illumination channel toward the monitor sensor. A spectrophotometer is also disclosed that includes a circuit board, illumination source and one or more sensors. The circuit board includes an optically transparent region, wherein the illumination source is mounted and situated relative to a first surface of the circuit board, so as to direct light through the optically transparent region. Each sensor is mounted and situated relative to a second surface of the circuit board opposite the first surface. In short, the cooperation of the light source 18 and the light sensing means 21 to form a color sensing means 20 is set forth to entirely encompass the operation of any suitable hand-held spectrophotometer assembly.

Block 15 schematically depicts a signal conditioning unit, signal bus and CPU operatively connected to the memory 16 when taken together. The light from the light source 18 is transmitted to strike incident upon the object 19. A lens may be used for collimation purpose and is thus aligned between the light source 18 and the light sensing means 21. The light source 18 of the illumination means may be positioned at the focus of the lens (not shown) so that a parallel light is produced on the other side of the lens to be made incident on the colored object. Use of the lens is optional.

A power supply 12, which is either a battery supply or an adapter, is connected to paint purchasing tool 10 to provide electrical power. Alternatively an internal power supply circuitry to condition the external power input may be used. While not shown, the power supply is connected to each of the shown blocks to provide power as needed to power each in the accomplishment of their stated functions.

In testing, the light source 18 is employed to illuminate the object. The object is preferably a flat surface comprising a colored pigment whose color reflectance is to be quantitatively determined and placed in the memory 16 in association with the test. The incident light of the illumination means is transmitted to the object and is reflected, the reflected light in turn falls on the light sensing means 21.

Alternatively, as a wave-guide and for avoiding the ambient light, a light guiding means like fiber-optic tube can be used between a light source 18 and the object giving a parallel light, or such a light guiding means like a fiber-optic tube can be used between the said lens of the light source and the object.

Modern colorimetry is based on tristimulus color measurement within the visible light range (often in the red, green, and blue configuration (RGB)), and is generally based on the analysis of tristimulus components incident to and then emitted from the surface of the object in question (e.g. related to monitor screen, fruits, paints etc.). The proposed usage of EF, namely, UV, IR etc. add extra dimensions to the analysis based on the transmitted/reflected light components. Instead of tristimulus, these proposed alternatives might be described as being pluro-stimulus (e.g. R, G, B, UV, IR components taken together in a set) value set. Such a set of pluro-stimulus values is called as color data hereinafter. The pluro-stimulus values in combination are measured and are used to match with a stored data for quantitative determination of a known substance.

The light source 18 must use light of known quality, color, and intensity. Red, green and blue lights may be combined to yield a white light and when quality and intensity are known, the combination is presently preferable. Other appropriate basic colors might alternatively be exploited in producing white light in concert with red, green and blue lights or instead of them. Other appropriate basic colors suitable for color measurement can also be used. Alternatively, red, green and blue (RGB) lights along with sources emitting extra frequencies like ultra violet (UV), infra-red (IR) etc. (like R, G, B light emitting diodes, IR light emitting diode, and UV light emitting diode) might also be used.

The light source 18 can also, optionally, be a halogen lamp or a light emitting diode (LED) or also a neon lamp or a xenon lamp or a light bulb or red, blue and green light emitting diodes combined to emit white light or R, G, B lasers giving a white light or a laser emitting white light, or any other means for giving a white light and/or extra frequency/frequencies of known quality and intensity. For example, a light source might advantageously be an LED creating broadband white-LED light by combining a white LED with 395-, 470-, 630-, and 660-nm LEDs to form a multi-LED die; such a configuration enables each die to be individually addressed for separate pulsing and intensity balancing. Dies might then be advantageously ganged to produce white light of the desired color spectrum and intensity. Thus, the light source 18, a die as described, yields a resulting white light contains all frequencies lying in the visible light spectrum.

In selected embodiments, electromagnetic frequencies which lie external to the visible electromagnetic spectrum [Extra Frequency or EF], like ultra violet (UV), infra-red (IR) etc., in addition to or a complete replacement to the white light source might be advantageously employed in a light source 18. By way of nonlimiting example, an illumination means is formed by having light sources emitting UV, IR etc. like IR LED (Light Emitting Diode), UV LED etc. in addition to or a complete replacement to the white light source. Naturally, the light sensing means 21 used is responsive to such frequencies as well as to white light and gives electrical signal output proportional to the corresponding extra frequency/frequencies (EF) components and the RGB components in the light incident on it. In such an exemplary configuration, the light sensing means 21 is formed of sensors responsive to EF along with the sensors responsive to white light. This light sensing means 21 might be a single sensor or an array of sensors on a die, wherein; the EF responsive component is embedded alongside white light sensors to constitute the light sensing means 21. Or a separate EF sensor is placed such that the light transmitted by the light source 18 is incident on EF sensor as well the white light sensor. Much as with the ganging of the multiple LEDs discussed above, multiple sensors of distinct wavelengths within and outside of the visible light spectrum may be advantageously ganged.

The light sensing means (sensor) 21 is typically a charge-coupled device (CCD) image sensor or a complementary metal-oxide-semiconductor (CMOS) sensor, which senses the incident light (transmitted/reflected) and outputs a set of signals representing the RGB or EF composition of the incident light in a form, which could be fed to the CPU 15. This can either be a digital signal in its raw form or encoded or scaled via a signal-conditioning unit. The light sensing means (sensor) may comprise array of sensors where each sensor is adapted to produce an electrical signal when light impinges thereupon.

All the signals from the light sensing means 21 are conditioned and supplied to central processing unit (CPU) 15. In one embodiment, the light sensing means is calibrated in phase-locked loop where the CPU is used to control the power supply 12 and thus attune the intensity of the light source 18 so that the light source 18 precisely illuminates the object with a well-defined output. CPU 15 is connected by two-way bus with the memory block 16 and the communication port 30.

The CPU 15 controls the amount of each of the R, G, B or EF components of the light source separately or as a whole, so as to achieve the desired defined intensity and quality of the light source. This is typically achieved by varying the current or the voltage supplied to each of the included light source element/s. Either the voltage or current is varied either by varying the supply voltage or current or any other parameter which would result in such variation.

For the purpose of maintaining a constant defined intensity and quality of light output, the present invention uses a closed loop control mechanism to keep the light source at a predetermined intensity and quality at a block 102. Accuracy of a test result in present invention requires that the quality and the intensity of the light of the light source, i.e. its RGB and/or EF composition, should be very similar in factory calibration as well as in an instrument used in any laboratory. This is necessary because each of the look-up table obtained is based on this reference value of constant quality and intensity of the incident light for their measurements.

The CPU 15 is used for performing the color matching logic operation and determining the concentration of the said colored solution. The obtained color signature for the said colored solution is used to select a pluro-stimulus value set from the corresponding look-up table which matches with it, and the concentration of related known substance is determined by looking-up the corresponding value of the concentration in the look-up table. When exact match is not found, in such case, the said computing means interpolates/extrapolates the color signature (the pluro-stimulus value set) using the array of corresponding look-up table pluro-stimulus values or by using the representative function formed using regression analysis, for determining the concentration of said known substance.

The sensor outputs a voltage proportional to all the light that it sees, weighted by the above curve. Therefore, when a subject is illuminated with a red LED only, it will respond with a voltage proportional to the red component of the subject's color, and similarly with blue and green. When there is ambient light mixed in with the LED's illumination, its effect can be eliminated by sampling first without any LEDs turned on, then subtracting this reading, in turn, from each of the red, green, and blue components. This reference measurement should be taken before each color measurement to eliminate any effects from varying ambient conditions. In the paragraphs that follow, it will be assumed that an ambient reference is taken and subtracted from each measurement discussed.

Because the light source and sensor may sit next to each other on the illumination sensor's circuit board, and because a plastic snorkel may, itself, reflect some light back (primarily from its threads), the light response from a completely black subject may be non-zero. For this reason, the black response, and indeed for each color component, might, advantageously, be determined experimentally, so that it, too, can be subtracted from the overall response. Thus at the block 102, for example, three components thus measured (with an ambient reference subtracted), $K_r$, $K_g$, and $K_b$, are known as the "black reference". A black reference is typically obtained only once before each measurement session. In a more general sense, calibration of the sensor and the snorkel and supporting structure of the housing, may also be calibrated against known color samples for accuracy.

While the ability to accurately sense color is a feature of the invention, the technology that enables that feature is largely known and most importantly, the particular color sensing mechanism is not the key feature of the invention but, itself, enables much of what the invention will do, as the purchase method is informed by the measured color of the sample surface. The power of the invention is in the facilitating of the purchase around the measured color.

In accord with a method 100, once calibrated, the CPU 15 draws instructions from memory 16 and displays a prompt to the user to "Position the sensor" at the object to be measured at a block 105. In response to the prompt at a block 108, the user positions the color sensing means 20 comprising of the light source 18 and the light sensing means 21 suitably over the object to be measured. At a block 111, the user triggers the measurement of the reflectance of the object. The CPU 15 checks to see if the response of the light sensing means 20 has transmitted to the CPU 15 is in accord with expected values at a block 114. Should the values be suitably within expected values, the CPU 15 associates the returned test values with an instance of testing at a block 117 and may be further associated with a verbose description through interaction with the user by means of the keyboard 45 and display 42.

To provide for interaction with a user, the invention can be implemented on a computer system having a display device such as a monitor or LCD screen for displaying, information to the user and a keyboard and a pointing device such as a mouse or a trackball by which the user can provide input to the computer system. The computer system can be programmed to provide a graphical user interface through which computer programs interact with users.

A keyboard 45 is for inputting the relevant data in the CPU 15. The display block 42 displays various texts and images. Control wheels, jog wheels, trackballs, and joysticks might also be used in concert with or in lieu of the keyboard 42 to fulfill the inputting function. In some embodiments of the paint purchasing tool 10, the display is a plurality of displays. In further embodiments of the paint purchasing tool 10, one or more of the plurality of the displays 42 are incorporated with the keyboard 45 in a touch-sensitive screen assembly at comprises the user hardware interface 40.

At a block 117, the CPU 15 stores the test results in memory 20 suitably associated with the test instance and any verbose description the user has entered by means of the user hardware interface 40.

Assuming, as we have, that the color of a surface can be measured and that the measurement as described herein provides an accurate assessment of the color of a surface, then the exploitation of that measured color value is the key as the use of the apparatus extends to the next steps.

Referring, now to FIGS. 1 and 3, a color replacement method 200 implements the use of the camera image stored in memory 20 by the CPU 15 after receipt of an image signal from the camera 39. At a block 201, the user receives a prompt the CPU 15 generates on the display 42. The camera 39 captures an image signal in response to a user activation of the camera 39.

At a block 207, the CPU 15, requires as input colorant characterization data and a set of colorant concentrations from the image the camera 39 captures. A color matching engine stored within the memory 20 obtains colorant characterization data for each of the colorants within the image in the form of a color-additive function for each of the colorants.

Color-additive functions are derived from colorant reflectivity data according to, by way of non-limiting example, pursuant to U.S. Pat. No. 6,646,763 to Estrada issued on Nov. 11, 2003. In the presently preferred embodiment, a vector whose percent colorant down is closest to that the CPU 15 retrieves from a look-up table stored in memory 20 is chosen. In an alternative implementation, the vector values are calculated by interpolation for each colorant according to the concentration of the colorant. No particular kind of interpolation is required. For example, a linear interpolation or an interpolation along the gamma curve of the colorant in question can be used.

At a block 207, the user designates a segment of the photo captured at the block 204 for color replacement. In response, the color matching engine obtains a set of colorant concentrations (a vector of at least three dimensions) that most suitably matches the color value stored at the block 117 and retrieved in response to user selection at a block 210. It is based upon the selected segment and the selected retrieved color, that the CPU 15 generates an altered photograph wherein the color of the segment designated at the block 207 in the photograph captured at the block 204 is replaced by the color retrieved at the block 210 and displayed on the display 42 at the block 213.

Additionally, in one presently preferred embodiment, a user can select one color based upon the at least one color stored in the system at the block 117, and in response, the invention can readily select colors that complement the selected colors in accord with the primary color using a color engine similar to that taught by Blanchard, et al. in U.S. Pat. No. 6,870,544 issued on Mar. 22, 2005 wherein a system and method for calculating harmonizing colors is based upon the reference color retrieved from memory by (a) defining a reference color in a uniform color space, (b) converting the hue of the reference color from the uniform color space to an artists' color wheel, (c) determining harmonizing colors for the reference color within the artists' color wheel, (d) converting the hues of the harmonizing colors from the artists' color wheel to the uniform color space, and (e) displaying the harmonizing color information. In a second embodiment, a brown region is defined for colors having red/orange/yellow hues and low chroma values. Additional harmonizing colors are determined when either the reference color or one of the harmonizing colors falls within the brown region. U.S. Pat. No. 6,870,544 issued on Mar. 22, 2005 is incorporated by this reference as if fully set forth herein. In this preferred embodiment, at the block 222, the user indicates that the photo is as the user envisions the photographed space. Advantageously, based upon the selections of colors, the user can now envision the space colored precisely as the user has proposed with the color values acquired in the testing.

At the block 216, it is the CPU 15 generates a message on the display 42 asking whether the color is the last color to be added to change the photograph. When completed, at a block 222, the user indicates that the photo is as the user envisions the photographed space. Advantageously, based upon the selections of colors, the user can now envision the space colored precisely as the user has proposed based upon the color values acquired in the testing.

At a block 225, the user is able to review the image portrayed upon the display 42 and, in response to a suitable prompt by the CPU 15, indicate that the colors in question are satisfactory to the user. When the user does so indicate satisfaction at the block 225, the CPU 15 generates a paint order form having zero quantity entries but including the exact colors the use wishes to order. This order form is stored in memory for later use by the system 10 when the user determines quantities of each of the paints.

Once the order form is drawn up, the user must determine the amount of paint that the user intends to use on each surface. The system 10 has further application in the estimation of paint quantities. Such estimation is based upon an estimation of surface area the paint is to cover and the user responses to question that the system 10 poses through CPU 15 generated prompts on the displays 42. A typical metric used within the painting industry is that a gallon of paint will typically cover 450 square feet according to the manufacturer's calculations.

Often times, an experienced painter might wish to vary that 450 slightly downward based upon observed characteristics of the surface and because of a risk of color variation, most painters will choose to err on the side of having slightly too much paint rather than slightly too little. For that reason, in this nonlimiting embodiment, the remainder of this discussion with reference to estimation shall refer to 400 square feet as the appropriate purchase amount, however, these statements are made with the understanding that there is no reason why the system could not substitute any designatable coefficient for the variance and the quantity 400 is purposefully selected in the discussion to show the transformation from the manufacturers' estimation of 450 to the system 10 estimation.

Thus, in accord with the determined coefficient, to determine the amount of paint required to cover a wall, the system 10 will, initially, multiply a measured height of a wall by a length of that wall, then divide by 400. By this means, the system will estimate that a gallon of paint will cover a 10×15-foot room (two 10-foot walls and two 15-foot walls, 8 feet high) with one coat. In a similar manner, the system 10 will estimate that two coats of the same exemplary surface will require 2 gallons.

Remembering that, with reference to FIG. 3, at a block 204, the user captured at least one image of the surface to be painted; at a block 207, the user selected segments of the picture to be assigned color values; at a block 225, the user indicated satisfaction with the assignment of color values to particular segments of the image; and at 228, the user prepared a form order with zeroed quantities indicating which of the colors that the user had assigned to which the image segments; the user can now estimate quantities in interaction with the system 10 by means of either designating verbose names of the colors as the user has assigned them or with actual image segments of the surfaces to be painted as the user has designated those image segments.

Referring, now, to FIGS. 1 and 4, the estimation aspects of the system 10 are explained. Earlier, the discussion of color sensing set forth interaction, with reference to the relationship between the CPU 15 and the color sensing means 20 comprising of the light source 18 and a light sensing means 21; in a similar manner, the CPU 15 is related to at least one rangefinder 28, and an attitude sensor 29. The rangefinder 27, might optionally include an aiming laser 24 to indicate a distance being measured. Where, in this discussion, the at least one rangefinder 27 and aiming laser 24 are described as referring to a plurality of rangefinders 27, each rangefinder 27 can be coupled with an aiming laser 24 such that, in one embodiment, four such aiming laser 24/rangefinder 27 couples are disclosed and suitably at right angles within a plane such that by placing the system in contact with the surface in question, in a manner where each of the four aiming lasers 24 are projecting laser dots on adjacent walls, a ceiling, and a floor, rangefinders may suitably obtain the dimensions of the surface in order to calculate the area of the surface being measured.

In another embodiment, an orientation of a single rangefinder is rotated within a plane parallel to the surface to be measured. In this manner, the rangefinder 27, in rotation will determine four local minima in a measured distance from the rangefiner 27, the local minima occurring in 90 degree intervals as the rangefinder 27 is rotated through a 360 degree rotation, thereby determining the dimensions of the area to be measured.

In one embodiment, the rangefinder 27 includes at least one ultrasonic ranging module. One suitable module is the Polaroid™ 6500 Ranging Module. Ultrasonic ranging entails transmitting a sound wave and measuring the time that it takes for the sound wave to reflect off of an object and back to the origin. The reflection time is proportional to the distance that the object is from the source. Ultrasonic modules are well suited to the distances likely to be encountered in interior applications in residential and office settings. In larger environments, laser rangefinders or laser or optical triangulation might better serve the purpose of estimating distances. Thus, when the term rangefinder 27 is used herein, the term is used to encompass the rangefinder means best suited to the application being discussed.

Where the estimation of interior walls, door and window openings is concerned, the attitude of the system 10 with reference to the presumptively rectangular surfaces enhances the accuracy of estimation. In most instances, the opposing boundaries of the surfaces to be measured are oriented such that they are described as "level" or horizontal, the remaining two boundaries being what is described as "plumb" or vertical. To that end, the system 10 optionally includes the attitude sensor 28.

In a simplest embodiment, the attitude sensor might include one or more spirit levels also known as bubble levels, an instrument designed to indicate whether a surface is level or plumb. Different types of spirit levels are used by carpenters, stone masons, bricklayers, other building trades workers, surveyors, millwrights and other metalworkers, and serious videographers. Spirit levels include a slightly curved glass tube which is incompletely filled with a liquid, usually a yellow-colored 'spirit' (a synonym for ethanol), leaving a bubble in the tube. A spirit such as Ethanol an ideal element for a bubble to travel the tube quickly and settle accurately with minimal interference generated from surface tension between the transfer fluid and the glass housing.

Alternately, a plumb-bob or a plummet is a weight, usually with a pointed tip on the bottom, that is suspended from a string and used as a vertical reference line, or plumb-line. The instrument has been used since the time of the ancient Egyptians by bricklayers, masons, and carpenters to ensure that their constructions are "plumb", or perfectly upright. Small plumb bobs are included in the kits of various instruments such as levels and theodolites. Plumb bobs are used to set the instrument exactly over a fixed datum marker, prior to taking fresh readings. In a similar manner, the plumb bob might be advantageously used to orient the system 10 relative to plumb.

A presently preferred embodiment includes an integrated MEMS (MicroElectroMechanical System) part such as the Analog Devices™ ADXL202 two-axis accelerometer containing a polysilicon surface-micromachined sensor and signal conditioning circuitry to implement an open loop acceleration measurement architecture. For each axis, an output circuit converts the analog signal to a duty cycle modulated (DCM) digital signal that can be decoded with a counter/timer port on the CPU 15. The accelerometer measures static acceleration forces such as gravity, allowing it to be used advantageously as an attitude sensor 28 for the system 10. As a result of knowing the attitude of the system 10, the CPU 15 can suitably adjust measured distances to derive a measurement of a surface area relative to the system 10.

Referring to FIG. 4, the system 10, allows the user an alternative to entering a stated surface area for estimating paint requirements. By a method 300, the system 10 is used to measure surface areas in the manner expressed above relative to the exploitation of four rangefinders 28 to measure a surface. To begin a method 300, the user, at a block 303, retrieves the order form with zeroed quantities to define the order based upon the to-be-measured surfaces. In one embodiment of the method 300, the CPU 15 recalls a verbose name the user has assigned to one of the at least one colors on the order form, asking the user to confirm the color for which the measurement will occur in accord with the method 300. In another embodiment, the CPU 15 will recall the image of the surface and denote for which surface the measurement is requested at the display 42.

Following the prompts, a user will place the device in contact with the surface and activate the device, thereby measuring a rectangular space the wall occupies. No allowance is made at this block 309 for any openings in the wall that will not require paint such as doors and windows. In one, nonlimiting, exemplary embodiment, the measurement of the rectangle occurs at the same time that the photospectrometry occurs and, thus, the device might, optionally, simultaneously measure size and color, thereby advantageously combining the methods 200 and 300 in execution.

To reduce the measured surface area by that amount a door or window removes from the painted surface, at a block 312, in most embodiments in response to prompts, the user will place the system 10 within the opening positioning the laser projected dots appropriately upon each of the boundaries of the opening. In most cases, the boundaries are appropriately termed the posts, lintel, and threshold, relative to a doorway and the posts, lintel, and sill with reference to a window. At a block 315, the user measures the opening in the same manner as measuring the surface, for removal of the resulting area from the total painted surface area. At a block 318, iterations of the process continue until all openings are removed from the measured surface. At a block 321, the resulting surface area is then calculated.

Optionally, when a wall is textured or rough-troweled, the user can adjust the quantity of paint relative to surface area so as to require more paint than if the measured surface were a smooth wall. The texture represents added surface to be covered, even though it does not contribute to the size of the area. Just how much more surface area there is depends on just how textured the surface is, but for medium-rough, porous, or previously unpainted walls, the system might optionally be set to estimate 300 to 350 square feet of coverage from a gallon of paint.

Once the surface area is converted to a quantity of paint, at a block 321 the order form saved at the block 228 is retrieved for amendment at a block 324 of the quantity of paint to be ordered. The quantity is then amended to a quantity in accord with the quantity of paint the method 300 estimated based upon the measured surface area. Remembering that the method 200 had associated with the color with the surface measured at the block 225, the form is readily amended with respect to the color in question to, thus, reflect the appropriate quantity of paint and the appropriate color of paint associated with the surface measured at the block 321. To further assure the proper association of color and quantity, at the block 327, the user is asked to confirm that the surface in question is the surface the user intends. At the block 330, in accord with the measurements taken, the openings subtracted and the designate rate of use in square feet per gallon, the required amount of paint is determined for inclusion in the order form retrieved as set forth above.

When, at a block 333, the user confirms that paint corresponding with all of the appropriate colors has been suitably ordered, the method 300, moves to amend the retrieved order form with suitable quantities of paint. At a block 336, the order is stored with suitable quantities of paint associated with color definitions readable by the vendor.

The system is well-configured for upselling other paint tools and expendables. Upselling is a sales technique whereby a vendor induces the user to purchase more items, accessories, tools, and other add-ons to make a more profitable sale for the vendor and to save the user multiple trips to the vendor or to alternate vendors for the tools necessary to complete the project. While upselling usually involves marketing more profitable services or products, upselling can also be simply exposing the customer to other portions of the task of painting that the user may not have considered previously. In the context of the system 10, the upselling has principally to do with the suitable equipping of the user to take down the task of painting the surfaces measured in the method 300. Generally speaking, the intended upsale works to the favor of both of the user and of the vendor.

Figure 5:
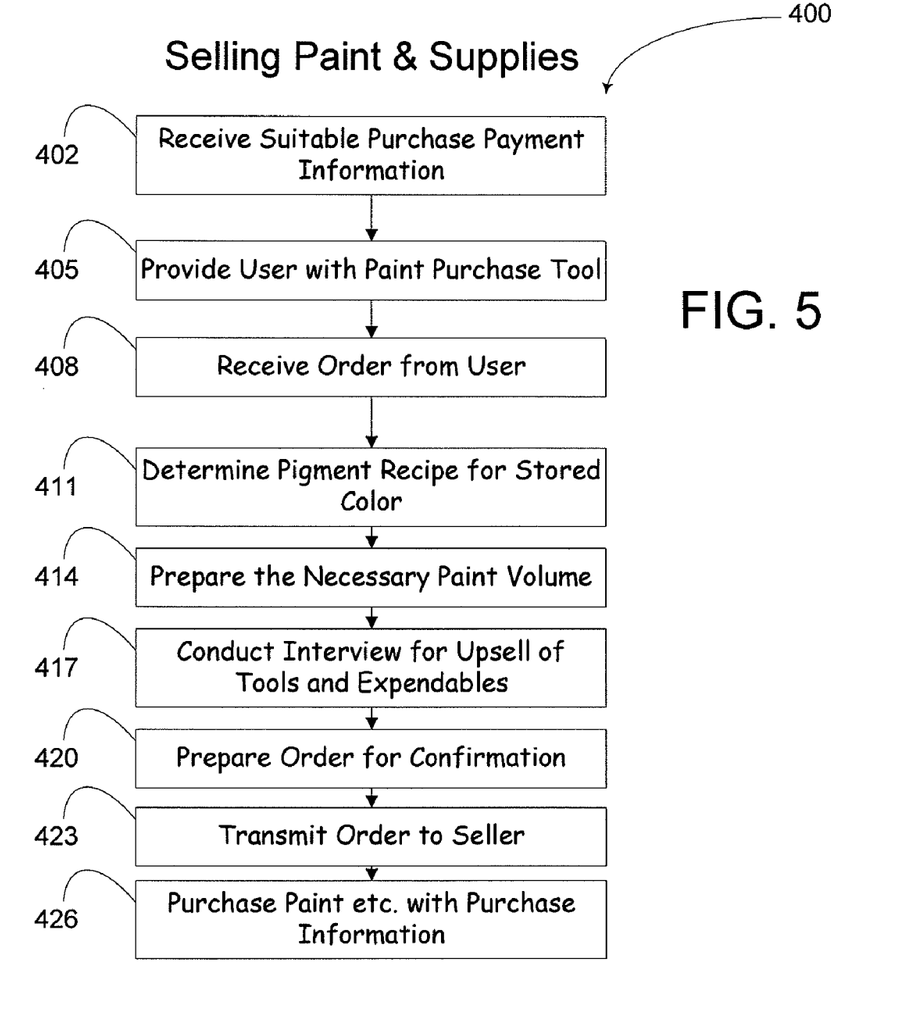
FIG. 5 is a flow chart for a method of selling paint and accessories based upon the estimated volume and corresponding colors

The method begins in a manner that is very familiar to individuals who rent equipment, the user will provide the vendor with suitable purchase information at a block 402 in exchange for the use of the system 10. In such an instance, a cash or credit card deposit is typically required as security against the return of the device.

The method 400 is a method that incorporates the methods 200 and 300 into a single method of selling and tinting paint for sale. A vendor, such as a Lowes™ or a Home Depot™ will own a selected number exemplars of the system 10 as described herein. By way of explanation, only one such exemplar of the system 10 is necessary in order to exploit the technology. Additional exemplars of the system 10 serve only to multiply the benefits of the system 10, enhancing the quantities of paint and other accessories to be sold.

The method 400 for selling paint and associated supplies begins when a vendor lends that system 10 to a user for the purpose of estimating and disassembling and order for custom tinted paint. Much as it occurs when a user rents equipment from an equipment rental, the user provides the vendor with the users purchase information. By purchase information, generally, the method 400 includes any information of sufficient particularity to allow the vendor to be suitably paid for the user's purchase of custom tinted paint. In most instances, the user will provide a credit card, or at least the information off the credit card for the purpose of effecting an eventual sale of custom tinted paint. Alternate means to achieve the same end might include the deposit of cash, the segregation of cash by means of a debit card, opening a credit account with the vendor, or other means of providing sufficient security to the vendor to allow the vendor to custom team paint in accord with the received order. The vendor receives this information at a block 402.

At a block 405, the vendor provides the user with this system 10, to aid the user in formulating in order for custom paint. The method 400 presumes that the user will both determine the colors of paint the user wishes to purchase, in accord with the method 200, and, in accord with the method 300, determine the quantities of each color of paint the user seeks to order.

At a block 408, the user provides the vendor within the order for the custom tinted paint. Recalling that at the block 321 the order form saved at the block 228 is retrieved for amendment at a block 324 of the quantity of paint to be ordered consistent with the chosen colors associated with surfaces indicated by the user, the method 400 uses the amended order form to initiate in order with the vendor for quantities of paint in the selected colors. In a presently preferred embodiment, the system 10 wirelessly transmits to the vendor the amended order form by wireless means through the radio communication port 33. Those wireless means might include transmission over a cellular network (such as a 3G network), a wi-fi transmission to a wireless access point enabling communication over the Internet at a connected router, a Bluetooth™ networked communication within the vendor's store, or other wireless means to communicate the amended order form to the vendor. In another embodiment, a communications port 30 is provided for USB communication or other proprietary wired communication to a terminal node in the vendor's network. By means of the communications port 30, the system 10 transmits the amended order form to the vendor for purposes of segregating base paint in the quantities ordered, and then, tinting in mixing the base paint to match the specified colors.

Advantageously, at a block 411, the vendor takes the received color definitions and, by means of a suitable lookup table, determines tint recipes necessary to produce paint according to the received color definitions. At a block 414, the vendor prepares the necessary paint volume. Advantageously, the paint can be prepared before the user returns the system 10 to the vendor.

To fully understand the advantage of the method 400 over current means of purchasing custom tinted paint, and anecdotal but nonlimiting example is useful. Should Mrs. User wish to repaint her breakfast nook the colors of a boiled egg, she might go to the exemplary vendor, Paints R Us, to place a deposit by means of credit card and to return to her home to suitably order paint for the breakfast nook with the system 10 in hand. She takes to color readings—one of the boiled egg white and a second of the boiled egg yolk. She then may, optionally, photograph the breakfast nook, but with or without the photograph, she measures the surface area of the walls to establish the necessary quantity of paint colored according to the measured reading of the egg white. A second measurement records the total of the smaller trim area in egg yolk yellow. Convinced that she has estimated the right areas and ascribe the proper colors, instructs the system 10 to send the order form to the vendor, Paints R Us.

Upon receipt, an automated terminal opens the suitable number of base paint cans, injects the recipe designated tints into the cans and reseals them with a suitable marking. The cans are suitably agitated to mix the tint and base to make colored paint and labeled according to the resulting color. The terminal then sends the transaction information to the credit card clearing house for payment and the transaction is complete. Mrs. User arrives at the vendor's store where she picks up the prepared paint at a "will call" window.

In other embodiments, she never leaves her home and the paint is delivered after preparation. In such a manner, even an internet site could serve as a virtual vendor. A user could order the system 10 through an Internet site that Paints R Us operates. Once Mrs. User logs in with her purchase information, the vendor sends the system 10 through a delivery service such as FedEx™ arriving the next day for Mrs. User's use to prepare the order in accord with measured colors and estimated quantities based upon estimated surface areas. Once her measurement and order are completed, Mrs. User wirelessly transmits the order, or transmits it by plugging the system 10 into her computer's USB port while logged into the vendor's website. The system 10 uploads the amended order form for transmission to the vendor. Upon confirmation, the vendor arranges the pickup of the system at Mrs. User's house as part of the delivery of the suitably tinted paint. The transaction complete, Mrs. User is, thus, able to begin her painting project on the weekend just a day or two after conceiving of the need for the paint.

For both user and vendor, the most important opportunity to exploit the system remains. At a block 417, after assembling in order for volumes of paint, the system 10, at the CPU 15, retrieves from memory 16, a template interview based upon the information the user has already provided to the system 10. For example, the quantities of paint ordered might be small and suggest to the system 10 that an interview as to the difference between tarps and drop cloths for use to protect carpeting or flooring may be appropriate. Image recognition software may further attenuate or amplify the template interview around issues relating to whether rollers rather than brushes would be the main means of placing paint on the wall. Additionally, by way of nonlimiting example, large expanses of planar surfaces in those images might well suggest to the system 10 that a question should be posed the user as to whether spray painting (allowing a vendor to upsell rental of a paint sprayer to the user) would be a more efficient means of placing paint on the surface. Even in the absence of the paint sprayer, the quantities of paint might well suggest the propriety of an assortment of trim brushes, angled brushes, and broad brushes for the efficient application of paint.

As in so many home improvement projects, the largest part of the battle for the unfamiliar user is in the preparation; simply knowing what equipment will make the task both economically affordable and efficient is the key. To a seasoned painter, the nature of the surface suggests a selected armory of tools that will appropriately allow the painter to finish a surface rapidly and well. The system 10, by modifying the interview based upon information already provided it, not only informs the user but also builds the user's confidence by not presenting the user with questions that seem entirely unrelated to the task at hand. Such unrelated questions implant doubts in the mind of the user has to the user's own sufficiency of knowledge in taking down the task. This interview the system 10 conducts not only affords the vendor the opportunity for the upsell but optimally instructs the user in the proper use of the tools. In one nonlimiting embodiment of the system 10, the user will also be presented with explanatory videos keyed to the interview such that where a question seems, to the user, not to make sense in the context of the purchase of paint or related supplies, the user might hit an exemplary "learn more" button which would file a one of the videos keyed to the precise point in the interview wherein the question arose in the user's mind.

As envisioned, the system 10 includes this templated interview in a decision tree form. By way of explanation, should a user decide that they wish to have a tarp rather than a dropcloth for purposes of protecting flooring and furniture, the interview, aware of the vendors inventory, selects for or more products with him than inventory which would meet the perceived needs of the user. In this fashion, the system will transmit to the vendor not only in order for paint and merchandise, but in some nonlimiting examples, also the exact nature of the responses the interview has elicited from the user. In such a manner the vendor accumulates a body of knowledge allowing the vendor the opportunity to refine the interview by knowing which questions elicited which responses from the users. In another nonlimiting example of the system 10, the interview templates are placed in the memory 16 by means of the CPU 15 and the radio communications link 33 such that the vendor can immediately update the interview template with the knowledge either of the vendor's inventory or of the responses certain questions elicit. Advantageously, the vendor can also use either of the radio communications 33 or the communications port 30 on the display 42 an image of merchandise the vendor selects for offering into the system 10 such that on the display 42 the image of the merchandise might be listed a sale or amplify the results of the targeted templated interview.

The interview can be well refined to further exploit opportunities for upselling of goods and services. Where a new product has been introduced into the market, for instance, a self edging roller, the interview can be amended to include a trigger for a video that demonstrates the roller in use. Used at appropriate points in the interview, such videos provide an additional opportunity for upselling these new products.

At a block 420, the system 10 appends the order for paint with the accessory orders the interview has elicted. Once appended, the system transmits the appended order by radio communications 33 or the communications port 30 to the vendor. Given that the vendor already holds purchase information such as a credit card number, transmission of the order is is sufficient to consummate the user's contribution to the sales transaction. Now the vendor holds a suitably funded order. In response to the order, the vendor assembles both the suitably mixed paints and the purchased accessories for conveyance to the user consummating the sale at a block 426.

Figure 6A:
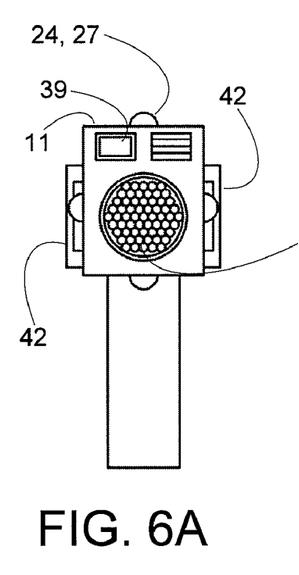
FIGS. 6A and 6B depict front views of a paint ordering system without and with a snoot.
Figure 6B:
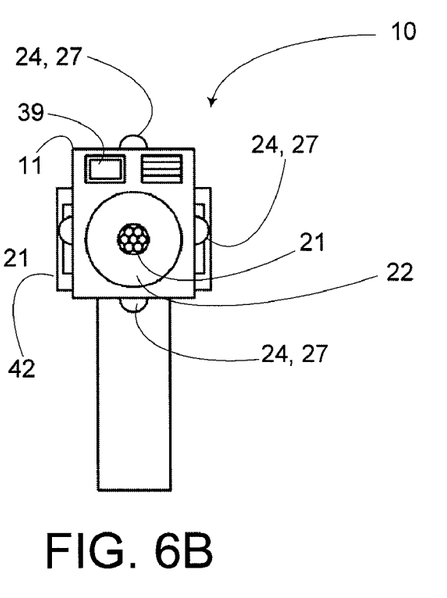
Figure 6C:
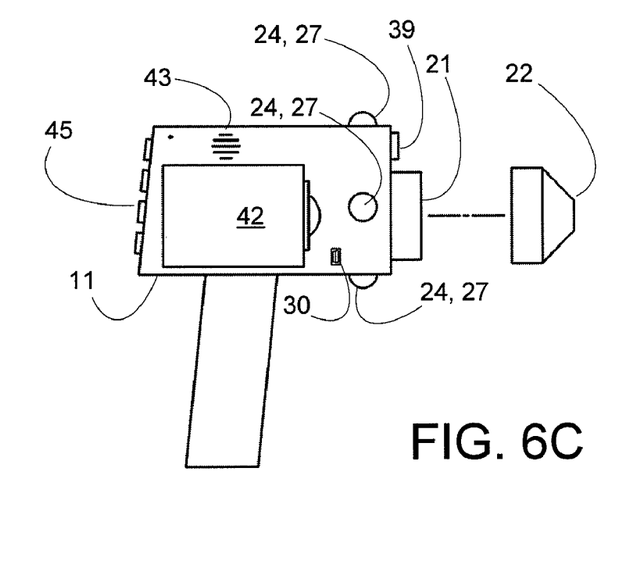
FIG. 6C depicts a side view of the paint ordering system indicating placement of the snoot.
Figure 7A:
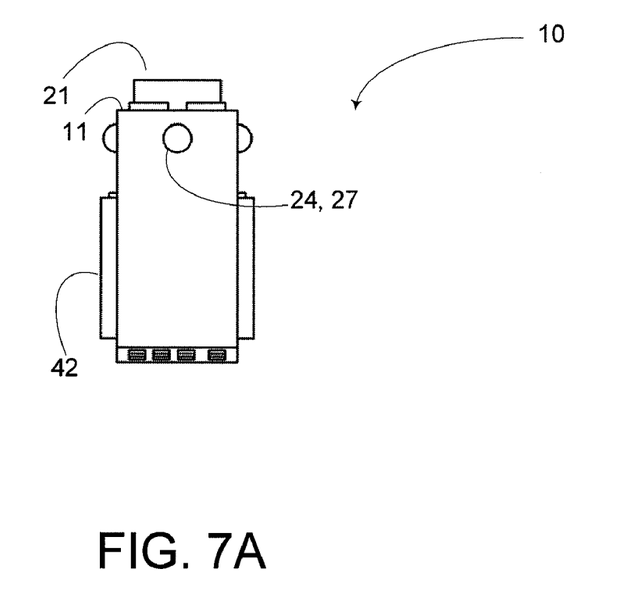
FIGS. 7A and 7B depict top views of the paint ordering system alternately with displays swung into contact with the housing and out from the housing.
Figure 7B:
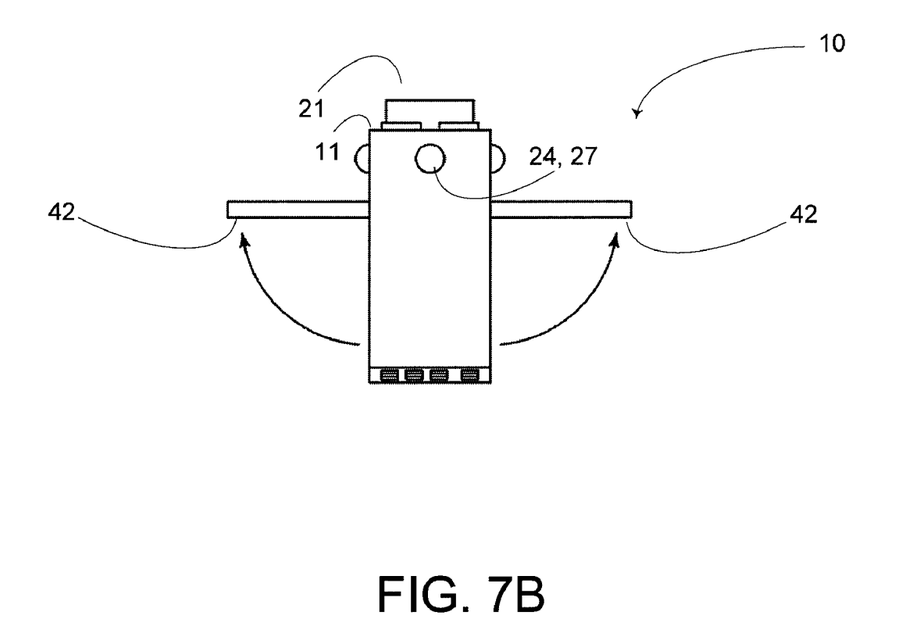
Figures 8A, 8B, 8C:
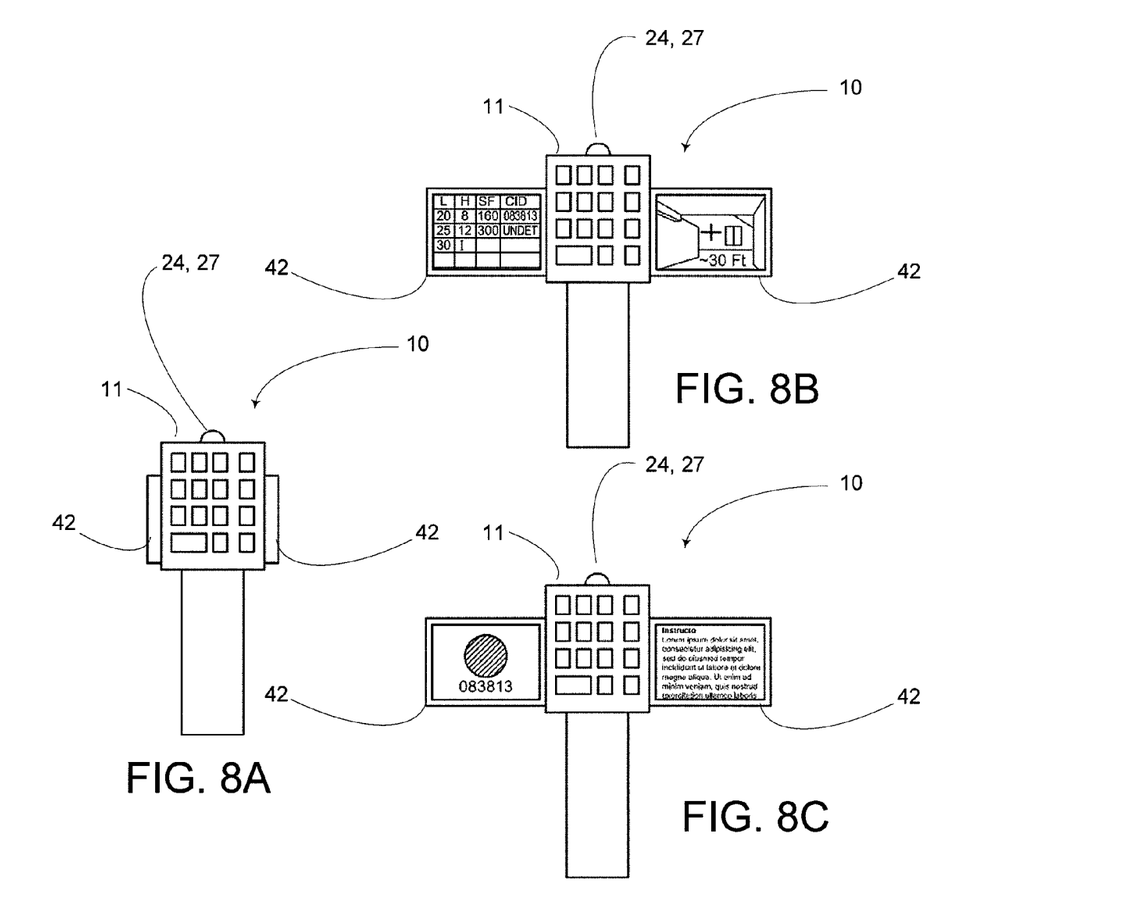
FIGS. 8A, 8B, and 8C depict rear views of the paint ordering system alternately with displays swung into contact with the housing and out from the housing.

FIGS. 6, 7 and 8 depict a preferred embodiment of housing 11 of the system 10 wherein a pair of displays 42 fold out from a pistol shaped housing 11. FIGS. 6A and 6B show the housing 11 from the front. FIG. 6A depicts the color sensor 21 without the protective snoot 22, whereas FIG. 6B shows the color sensor 21 with the protective snoot 22 in place. Also shown in each of FIGS. 6A and 6B are the four nodes which combine an aiming laser 24 and a rangefinder 27. The aiming laser 24 allows the user to accurately position the respective four spots each of the lasers 24 project outward on surfaces that bound a surface to be measured when the rangefinders 27 are suitably activated. Placing the four lasers 24 and their respective rangefinders 27 in ringing relationship to the color sensor 21 such that each are perpendicular to an axis the housing 11 defines and are perpendicular to the two combinations to either side of each combination aiming laser 24 and a rangefinder 27.

Also present is the window in the housing 11 through which the camera 39 collects an image for storage in the memory 16 as well as its focusing rangefinder. Each of the displays 42 is attached to the housing with articulated mounts. Also present is a speaker working as an enunciator in conjunction with the displays as a part of an integrated user interface. The keyboard 45 is also working to allow the user to interact with the system 10. A mini-USB port is also present to serve as a communications port 30.

FIGS. 7A, 7B, and 7C depict the housing 11 from above, a view advantageously selected to demonstrate the swinging mount for the displays 42 on their articulated mounts. As is evident in FIG. 7A, the displays are advantageously swung into contact with the housing 11. Likewise evident in FIG. 7B, the displays can be advantageously swung to an open position. Also included in this depiction for purposes of orientation are the aiming laser 24 and the rangefinder 27 combinations set orthogonally to each those others immediately adjacent to it for a total of four such combinations defining a plane in which the color sensor 21 resides.

In a similar manner FIGS. 8A, 8B, and 8C depict the system 10 with the displays 42 alternately swung into and out of the housing 11. FIG. 8A depicts the displays 42 swung into the housing 11 from a user's eye view of the system 10. FIGS. 8B and 8C show the displays 42 swung out for use. In the FIG. 8B, the displays are portraying screens to assist the user, using the aiming laser 24 and the rangefinder 27 combinations to estimate a wall. In the right hand display 42 a previously captured image of the surface to be measured is being used to guide the user to the surface for the estimation of the paint needed to cover that surface. On the left handed display 42, the dimensions of the surface as just measured are displayed in a tabular form.

In FIG. 8C, the interview process is occurring between the system 10 and the user. On the right hand display, the user is presented with a question as to whether the dot of color depicted along with its designation retrieved from a recipe look-up table is the color the user wishes to assign to the previously displayed surface. In this manner, the use may use the system to "color switch" the image to portray the surface as it will appear when suitably painted with the colors assigned.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the preferred embodiment of the invention has been illustrated and described, as noted above, many changes can be made without departing from the spirit and scope of the invention. For example, while a preferred embodiment of the system housing has been set forth, alternate housings could equally serve the ends of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of ordering paint, the method comprising:
   providing, by a retailer at a retail establishment, a portable self-contained paint purchasing tool to a consumer;
   at a location different than the retail establishment:
      determining, by the paint purchasing tool, a color of paint by illuminating a sample with a light and sensing colors within the light reflected from the sample using the paint purchasing tool;
      calculating, by the paint purchasing tool, a quantity of the color of paint required to cover a surface based on dimensions of the surface, wherein the dimensions are determined using at least one of an ultrasonic rangefinder within the paint purchasing tool or laser rangefinder within the paint purchasing tool; and
      recommending, by the paint purchasing tool, at least one additional product for purchase based on an analysis of at least the calculated quantity of the color of paint, wherein the at least one additional product is at least one of a brush, roller, sprayer, tarp, or drop cloth;
   transmitting, by the paint purchasing tool, an order for the at least the quantity of the color of paint and at least one additional product to the retailer.

2. The method of claim 1, wherein the calculating a paint quantity includes:
   selecting a suitable ratio expressing the quantity of paint to cover the surface of having the dimensions of the surface; and
   calculating a quantity of paint necessary to cover the surface.

3. The method of claim 2, wherein the selecting a suitable ratio includes interviewing the user to determine a quality of the surface.

4. The method of claim 1, wherein the transmitting includes transmitting through a communication port selected from a group consisting of radio communication, cell phone link, and a wired communications port.

5. The method of claim 1, wherein the method further includes:
   receiving from a user payment information at a vendor server;
   receiving the transmitted order from the processor to the vendor for formulating the paint quantity having the color value; and
   formulating the paint in accord with the order.

6. The method of claim 1, wherein retrieving a paint quantity includes:
   capturing an image of the surface with a camera;
   amending the image of the surface based upon the color of paint; and
   displaying the image as amended at a display.

7. An apparatus for ordering paint, the apparatus comprising:
   a portable self-contained paint purchasing tool including a processor having memory;
   at least one color sensor and light source included as part of the paint purchasing tool, wherein the paint purchasing tool is configured to illuminate a sample with a light from the light source and with the color sensor sense colors within the light reflected from the sample;

at least one ultrasonic or laser rangefinder included as part of the paint purchasing tool, wherein the paint purchasing tool is configured to receive dimension data from the at least one rangefinder and calculate a quantity of the color of paint required to cover a surface based the dimension data;

at least one display included as part of the paint purchasing tool, wherein the paint purchasing tool is configured to generate an interview for a user on the display, wherein generating includes recommending at least one additional product for purchase based on analyzing at least the calculated quantity of the color of paint, wherein the at least one additional product is at least one of a brush, roller, sprayer, tarp, or drop cloth; and at least one transmitter included as part of the paint purchasing tool, wherein the paint purchasing tool is configured to transmit an order for at least the quantity of the color of paint and at least one additional product to a retailer computer for fulfillment of the order.

8. The apparatus of claim 7, further comprising:
a camera to capture an image of the surface and formulate an image signal the camera sends to the processor.

9. The apparatus of claim 8, further comprising:
instructions stored in the memory to instruct the processor to perform the steps of:
   amending the image of the surface based upon the color value; and
   displaying the image as amended at a display.

10. The apparatus of claim 7, further comprising:
instructions stored in the memory to instruct the processor to perform the steps of:
   receiving from a user payment information at a vendor server;
   receiving the transmitted order from the processor to the vendor for the paint quantity having the color.

11. The apparatus of claim 10, further comprising:
instructions stored in the memory to instruct the processor to perform the steps of:
   selecting a suitable ratio expressing the quantity of paint to cover a surface of a known area based upon the interview; and
   calculating a quantity of paint necessary to cover the surface.

12. The apparatus of claim 7, wherein the user interface includes at least one of a touch-sensitive surface on the display and a keyboard.

13. The apparatus of claim 12, further comprising:
instructions stored in the memory to instruct the processor to perform the steps of:
   displaying questions in the interview;
   receiving answers through the user interface; and
   amending the order based upon the answers.

14. The apparatus of claim 13, wherein the written instructions stored in the memory to instruct the processor to perform the steps of:
   displaying questions relating to painting accessories; and
   amending the order based upon the answers to include an order for painting accessories.

* * * * *